Figure 1:
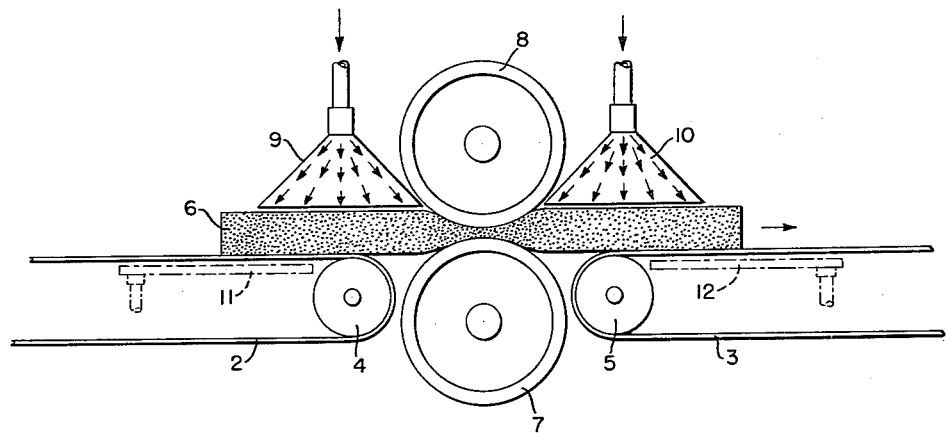

INVENTORS
THOMAS H. ROGERS, JR
BY DONALD W. PEABODY

J.B. Holden
ATTORNEY 3,061,885
TREATMENT OF POLYURETHANE FOAMS
Thomas H. Rogers, Jr., and Donald W. Peabody, Akron, Ohio, assignors to The Goodyear Tire & Rubber Company, Akron, Ohio, a corporation of Ohio
Filed Sept. 8, 1959, Ser. No. 838,639
1 Claim. (Cl. 18—48)

This invention relates to the preparation of substantially open-cell flexible cellular polyurethane compositions and more particularly it relates to a method for accelerating the cure of substantially open-cell flexible cellular polyurethane compositions in order to develop optimum physical properties in the product without the necessity for aging the product for several days.

In the preparation of elastomeric polyurethane foam products either by the one-shot or prepolymer method, it has been found necessary to age the product for from several days to about a week in order to insure that the product has developed its optimum physical properties. For example, if a freshly-formed elastomeric cellular polyurethane composition, i.e. one less than one day old, is subjected to the 50% compression set test at 158° F. for 22 hours, it loses about 50% of its original gauge or thickness; whereas, if the same test is run some days later, entirely different and better results are obtained. Consequently, the foam manufacturer must wait for his product to age before he can determine definitely that it meets specification. This inability to determine immediately the optimum physical characteristics of a freshly made polyurethane foam prevents the manufacturer from taking immediate corrective measures if his product should fail to meet the required standards.

The principal object of this invention is to provide a method for preparing substantially open-cell flexible cellular polyurethane compositions which develop their optimum physical characteristics without being aged over extended periods of time. Another object is to provide a method for accelerating the cure of substantially open-cell flexible cellular polyurethane products to obtain optimum physical properties substantially as soon as the product is made. Still another object of this invention is to provide a substantially open-cell flexible cellular polyurethane composition which is more fully cured immediately after the formation of said foam. Still other objects of this invention will be apparent from reading the following specification and claims.

The objects of this invention are obtained by (1) forming a substantially open-cell flexible polyurethane composition in the conventional manner through the reaction of water, an organic polyisocyanate and a reactive-hydrogen-containing compound such as polyesters or polyethers to produce a cellular product and (2) then aerating the product for a short time.

It has been discovered that the desired improvement in the physical properties of the cured polyurethane compositions are obtained by subjecting the freshly formed cellular product to the action of a heated gas or gases under conditions whereby the gas entering the cellular product has a higher pressure than the gas leaving said product. Thus this process comprises essentially subjecting a cellular product to warm gases under a differential of pressure between one pair of its opposite sides. This is best achieved by allowing a stream or jet of warm air to contact and pass through the cells or pores of the cellular product. The manner in which the contacting of the cellular product with the hot gas, preferably hot air, is achieved can be varied. For instance, the product can be subjected to successive blasts of hot air and between each blast subjected to compression which expells the air absorbed in the pores of the cellular product in a manner analogous to the way in which water absorbed in a sponge may be expelled by squeezing the sponge. A further advantage of subjecting the cellular product to successive blasts of hot air and compression is that it aids the passage of air into the cellular product since the expansion of the compressed product sucks in additional amounts of hot air to replace the air removed when the cellular product was compressed. In a further variation in the method of treating the cellular product is may be passed into a heated air oven and while in said oven be subjected to successive compressive and releasing action which will effect the desired washing or flushing of the product with the warm gas. The temperature of the hot air is not particularly critical. It has been generally observed that temperatures of approximately 100° F. are sufficient to achieve the desired results while temperatures in excess of about 250° F. are to be avoided since higher temperatures may adversely affect the desired physical properties.

Usually, where the warm gas contacting the cellular product has a pressure from 5 to 100 pounds per square inch, sufficient differential in the pressure between the opposite sides of the cellular product will be developed to achieve the desired flushing of the unreacted reactants and odorous materials from the cellular product. It should be obvious that, if the pressure is too great, the cellular product may be damaged by the aeration treatment. Therefore, it is preferred that the pressure of the warm gas contacting the cellular product should preferably be between about 5 and 25 pounds per square inch depending upon the thickness of the cellular product. Also, it should be readily apparent to those skilled in the art that the thicker cellular products would require longer times of treatment or a greater air pressure than where the cellular product is thin; but, in general, exposure of the cellular product to air treatment for from 2 to 10 minutes will be sufficient to accomplish the desired acceleration of the curing rate and also remove any residual traces of diisocyanate odor.

The polyurethane products may be made by either the one-shot or prepolymer method. In the prepolymer method the reactive-hydrogen-containing compound is reacted with an excess of polyisocyanate to form a prepolymer. After the exothermic heat of reaction subsides, the prepolymer is mixed with water together with any other desired ancillary compounding agents to produce the foamed product. Alternatively, all of the ingredients may be mixed together substantially simultaneously, without the previous formation of a prepolymer, in the so-called "one-shot" technique for preparing polyurethane products.

The reactive-hydrogen-containing compounds, such as polyesters, polyesteramides and alkylene glycols, useful in this invention normally have a molecular weight of about 750 to 10,000 and preferably 1500 to 3500. Specific examples of these hydroxyl-terminated polyesters are ethylene glycol adipate, propylene glycol adipate, butylene glycol adipate, polyethylene glycol suberate, polyethylene glycol isosebacate and related alkyd resins having at least two hydroxyl groups. Specific examples of suitable polyether glycols are polyethylene glycol, polypropylene glycol, tetramethylene glycol, etc.

Examples of the polyisocyanates are tolylene diisocyanate, xylylene diisocyanate, phenyl diisocyanate, diphenyl methane diisocyanate, hexamethylene diisocyanate, etc.

The following United States patents, 2,625,531; 2,625,532; 2,625,535; 2,692,873 and 2,702,797, list additional polyisocyanates and reactive-hydrogen-containing compounds useful in this invention and United States patents 2,846,408, 2,785,739 and 2,764,565 disclose certain procedural variations and apparatus suitable for making foamed polyurethane elastomers.

When using the one-shot method, it is very helpful to use an emulsifying agent to facilitate the incorporation of the water with the diisocyanate and the reactive-hydrogen-containing material and also to control the pore size of the cellular product. The water soluble organic silicone materials such as X–520, a proprietary product of Union Carbide, is generally preferred as an emulsifier in the one-shot process. The preferred organic silicone is a polyoxyalkalene-polydimethyl siloxane block type copolymer.

Activators such as the tertiary amines are found to be useful in controlling the reaction between the polyisocyanate, hydroxyl-terminated polymer and the water to give a foam of the desired physical characteristics. Examples of suitable tertiary amines which are useful for this purpose are triethyl amine, N-methyl morpholine, dimethyl aniline, diethyl aniline, tripropyl amine, N-methyl piperidine, diethyl cyclohexylamine and pyridine and the amine/aldehyde condensation products such as those described in United States Patents 1,780,326 and 1,780,334.

Also, it has been found to be advantageous to use a reticulator to further enhance the physical properties of the foams developed by the one-shot or the prepolymer method. The preferred reticulators are the diols and the diamines. Representative examples of the diols are 1,6 hexane diol; thiodiglycol; methylhexane-1,6-diol; diethylene glycol; ethylene glycol; propylene glycol; 1,4-butanediol; xylylene glycol; etc. Examples of suitable diamines are ethylene diamine; propylene diamine; toluylene diamine; o-dichlorobenzidine; nitrobenzidine; 4-amino-2'-amino-diphenyl; dianisidine; diamine phenetole; 4,4'-diamino-diphenyl methane; 3,3'-dichloro-4,4'-diamino-diphenyl methane; 1,5-naphthylene diamine; phenylene diamine and 2,5-dichlorophenylene diamine. The use of small amounts (10 to 30% by weight based on the reticulator) of triols and triamines with the difunctional reticulator is sometimes advantageous.

To illustrate the beneficial effects of this invention on the physical properties of the cellular products, a prepolymer was prepared by reacting 3750 parts by weight of diethylene glycol adipate of about 2000–3000 molecular weight with 1900 parts by weight of tolylene diisocyanate. The exothermic heat of reaction of this polyester with the diisocyanate raised the temperature of the reaction mixture to about 150° F. After the prepolymer had cooled, 50 parts by weight of the reaction product of 4 mols of butyraldehyde with 1 mol of butylamine were added. Then 70 parts by weight of water were intimately mixed with the prepolymer-activator mixture and the complete reaction mixture was allowed to foam. As soon as the foam had gelled and cured sufficiently to be crushed it was subjected to a positive jet of air having a temperature of about 100° F. and a pressure of 25 pounds per square inch. After the cellular product had been treated for ten minutes with warm air, a test sample of the treated cellular material was compressed to 50% of its original thickness and maintained at 158° F. under 50% compression for 22 hours. Then it was allowed to stand one-half hour without compression and its thickness gauged. The gauge reading indicated that the sample had recovered 95.3% of its original gauge. The compression set value of this treated sample did not change appreciably after aging 7 days. When a second foam sample which had been prepared using the identical formulation above, but which was not subjected to the hot air treatment, was subjected to the same compression test, it recovered only about 55.2% of its original gauge. A portion of the same sample which had been allowed to age for 6 days before being subjected to the compression set test, recovered about 95% of its original gauge. This data demonstrates that the practice of this invention permits substantially open-cell flexible cellular polyurethane products to be produced which develop optimum physical properties almost immediately relative to the several days required where the foam is not aerated. Hence, the practice of this invention eliminates the need for extended aging in order to develop optimum physical properties in the foam product.

Similar results were observed when polyurethane products prepared from polyalkylene ether glycols were subjected to the hot air treatment.

The practice of this invention is further illustrated with reference to the accompanying drawing in which FIG. 1 represents one method for practicing this invention. In FIG. 1, a pair of endless conveyor belts 2, 3 travel around the belt rolls 4 and 5 respectively. A slab 6 of flexible polyether urethane foam is shown passing from belt 2 through the crushing rolls 7 and 8 onto belt 3. Air jets 9 and 10 are shown positioned above belts 2 and 3 respectively. Thus as the slab 6 passes between crushing rolls 7 and 8, the air streams from jets 9 and 10 strike the upper surface of slab 6. This arrangement permits the air from jet 9 to strike the foam before it is crushed and thereby saturate the foam with air. The crushing action of rolls 7 and 8 expels the air from the foam, and then the air from jet 10 will be sucked into the foam as the foam expands on leaving the crushing roll 7 and 8. Thus, this embodiment uses the air from the jets in cooperation with the action of the crushing rolls to enhance the aeration and hasten the curing of the foam and the removal of the odor of the diisocyanate.

In an alternative arrangement of the air jets 9 and 10, they are located under the belts as shown by the dotted lines 11 and 12. In this arrangement the air passes upward through the foam. Thus belts 2 and 3 will have to be porous. The preferred arrangement of the air jets is that they be above the belts. This arrangement allows the air-stream to pass downward through the foam and thereby permits a greater pressure of air to be used without blowing the foam product off the belts. Even in this case the pressure of inert gaseous streams from jets 9 and 10 should be less than the pressure which harms or destroys the foam. Depending upon the length of treatment time desired or required for treatment, the cellular products can be passed through a succession of compression rolls or, alternatively, repetitively through the same compression rolls. A still further alternative method would be to position one compression roll above a continuous conveyor belt supported adequately below the compression roll to permit compression of the product as it passed under the roll. It should be appreciated that the use of crushing roll in conjunction with aerating is only a preferred method of accomplishing the objectives of this invention.

While certain representative embodiments and details have been shown for the purpose of illustrating the invention, it will be apparent to those skilled in this art that various changes and modifications may be made

What is claimed is:

In a process for preparing a substantially open-cell flexible polyurethane composition formed by means of the action of water with the excess polyisocyanate present in the reaction product of a polyisocyanate with a reactive-hydrogen-containing compound, the improvement which comprises aerating the freshly formed foam from 2 to 10 minutes with a positive gaseous stream having a temperature of about 100 to 250° F. and a pressure of about 5 to 100 pounds per square inch.

References Cited in the file of this patent

UNITED STATES PATENTS

| | | |
|---|---|---|
| 2,384,387 | Meyer | Sept. 4, 1945 |
| 2,774,991 | McCurdy et al. | Dec. 25, 1956 |
| 2,827,665 | Rogers et al. | Mar. 25, 1958 |
| 2,857,625 | Carlson | Oct. 28, 1958 |
| 2,850,467 | Livingood | Sept. 2, 1958 |
| 2,884,386 | McMillan et al. | Apr. 28, 1959 |
| 2,933,767 | Vieli et al. | Apr. 29, 1960 |

OTHER REFERENCES

Effects of Foaming Catalysts, Rubber Age, August 1957, vol. 8, No. 5, pages 799 to 803.